April 3, 1956  M. TORRENT  2,740,534
LUGGAGE RACKS FOR AUTOMOBILES
Filed Dec. 19, 1952  2 Sheets-Sheet 1
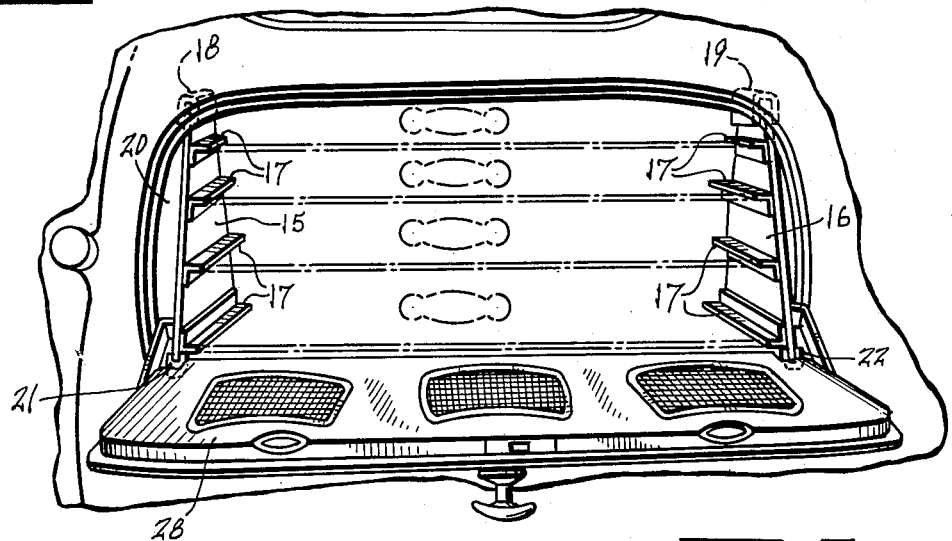
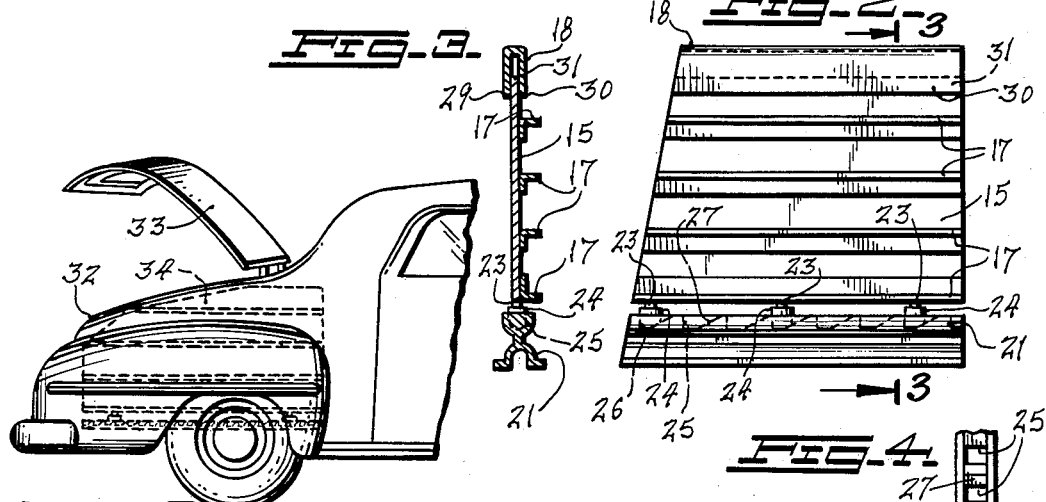
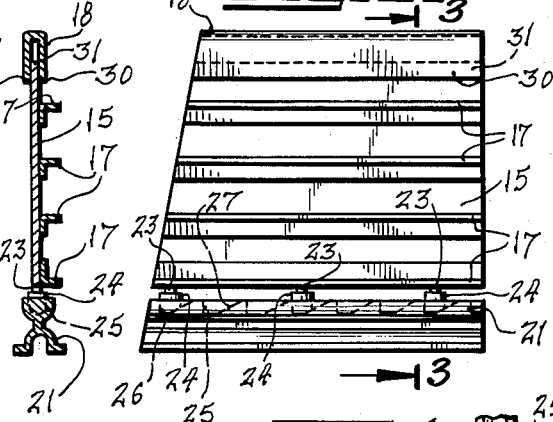
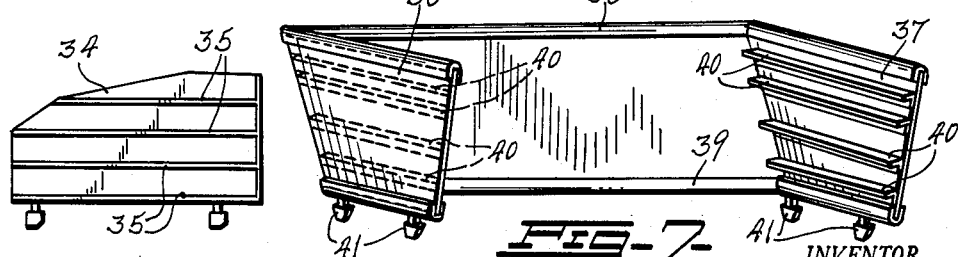
INVENTOR.
MARTIN TORRENT
BY
*ATTORNEY*

April 3, 1956
M. TORRENT
2,740,534
LUGGAGE RACKS FOR AUTOMOBILES
Filed Dec. 19, 1952
2 Sheets-Sheet 2
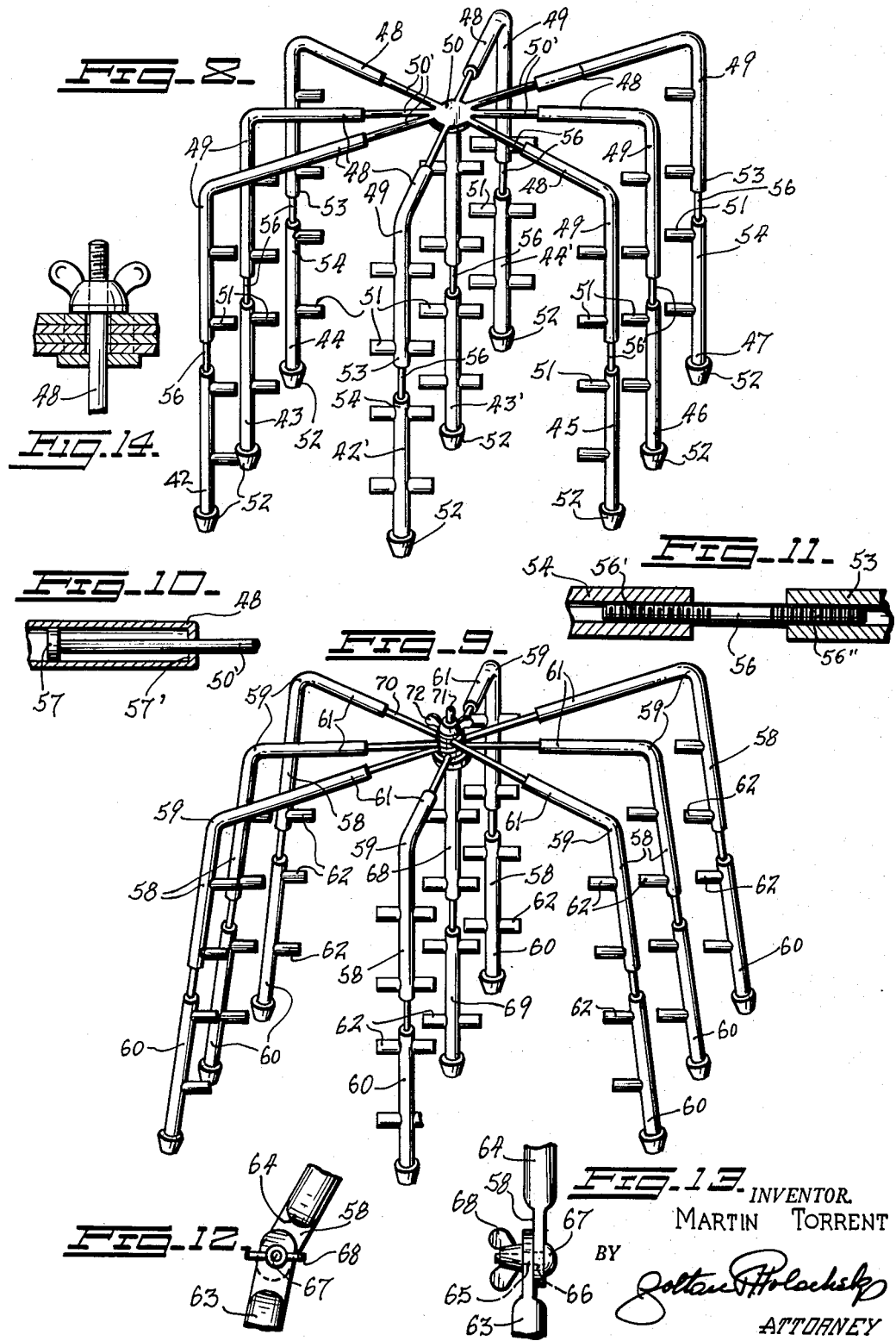
INVENTOR.
MARTIN TORRENT
BY
*Jolton Holochsky*
ATTORNEY United States Patent Office 2,740,534
Patented Apr. 3, 1956

2,740,534
LUGGAGE RACKS FOR AUTOMOBILES
Martin Torrent, Palma de Mallorca, Spain
Application December 19, 1952, Serial No. 326,961
1 Claim. (Cl. 211—178)

This invention relates to new and useful improvements in luggage racks for automobiles.

More particularly, the present invention proposes the construction of a luggage rack for an automobile trunk which permits the maximum use of trunk space for luggage storage and hold individual pieces of luggage horizontally stacked in orderly arrangement for convenient removal.

Another object of the present invention proposes forming the luggage rack with removable side members so that individual pieces of luggage on the rack may be separately removed or all of the pieces of luggage may be withdrawn at least partially from a trunk for individual inspection or easier handling.

Still further, the present invention proposes constructing the luggage rack with resilient tipped feet each having a flat vertical front surface and an inclined rear side and providing a channel-shaped member with rack-like recesses of like shape to receive the feet and permit the rack to be slid back into a trunk but to prevent inadvertent movement toward the door or lid of the trunk compartment.

As a further object the present invention proposes forming a luggage rack which can be set into the trunk compartment of any automobile and which will securely hold luggage horizontally disposed and orderly stacked in the trunk.

The present invention further proposes constructing a luggage rack with bent legs having horizontal portions and dependent portions, both portions being extensible so that the rack may be extended or contracted and its shape generally altered to conform to the luggage pile to be stacked within an automobile trunk on the rack.

For further comprehension of the invention and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a pictorial view of the trunk compartment of an automobile with the luggage rack of the present invention therein and luggage indicated on the rack in dot-dash line outline.

Fig. 2 is a side elevational view of one of the side plates of the luggage rack and its holding structure as shown in Fig. 1.

Fig. 3 is a sectional view taken on line 3—3 of Fig. 2.

Fig. 4 is a fragmentary top plan view of one of the lower channel-shaped members holding the side plates.

Fig. 5 is another pictorial view of a different type trunk compartment with the shape of the luggage rack modified accordingly and indicated in dotted outline.

Fig. 6 is a side elevational view of one of the plates indicated in Fig. 5.

Fig. 7 is a perspective view illustrating a modification of the luggage rack.

Fig. 8 is a perspective view showing another modification of the present invention.

Fig. 9 is a view similar to Fig. 8 but illustrating a modification thereof.

Fig. 10 is a fragmentary sectional view showing a detail of construction in the structures illustrated in Figs. 8 and 9.

Fig. 11 is a view similar to Fig. 10 showing a further modification thereof.

Fig. 12 is a detail view of a modified form of construction of the structure of Fig. 9 and showing an adjustable bent leg member.

Fig. 13 is a side elevational view of Fig. 12.

The luggage rack, in accordance with the first form of the invention illustrated in Figs. 1 to 4, inclusive, has two side members or plates 15 and 16 each having a plurality of luggage holding elements or members 17 secured to them in spaced aligned and opposite relation. The luggage holding elements 17, as shown, are angle iron pieces each having one leg welded or otherwise secured to one of the side plates and the other leg extending out from the side plate at right angles thereto forming a ledge or shelf.

A pair of channel members 18 and 19 are secured to the upper part of an automobile trunk 20 and a corresponding pair of channel members 21 and 22 are secured at the bottom of the trunk in aligned relation to the first pair of channel members 18 and 19 inside the trunk.

Channel-shaped member 18 overlies the channel member 21 at one side of the automobile trunk compartment and channel-shaped member 19 overlies channel member 22 at the other side of the trunk. The channel members provide means to hold the side members 15 and 16 spaced opposite one another in trunk 20 with the luggage holding elements 17 horizontally disposed to hold a piece of luggage (shown in dot-dash outline in Fig. 1) horizontally disposed between each two of the luggage elements directly across from one another on the side members 15 and 16.

Both side members, 15 and 16, have a plurality of dependent feet 23 with rubber-caps 24. The caps 24 are shaped to fit any one of a series of aligned recesses 25 in the lower channel members 21 and 22. Recesses 25 have a vertically disposed front wall 26 and an inclined rear wall 27. The inclinations of rear wall 27 is toward the rear of the trunk 20 away from the trunk lid or door 28. The resiliently tipped feet 23 fit into these recesses 25, the caps 24 being of a shape to correspond to the recesses. In this manner a means is provided to lock the plates in the channel members. The plates 15 and 16 may be slid rearwardly on the inclined surfaces 27 but are prevented from sliding forward toward the lid or door 28 by the front walls 26 of the recesses and the abutting surfaces on the rubber feet caps 24.

The channels or channel members 18 and 19 secured to the upper part of trunk 20 each have downwardly depending flanges 29 and 30 straddling the upper edge or upper marginal edge portion 31 of the side members or plates 15 and 16. This permits the plates, which are spaced from the web of the channel, to be movable vertically upward to lift the feet 23 from recesses 25 and to slide them rearwardly (away from trunk lid 28) from one recess to the next.

In the modification illustrated in Figs. 5 and 6, the side plates are shaped to conform to the type of trunk compartment 32 having an upwardly raising lid or cover 33. The side plates are both similar to the one side plate 34 best shown in Fig. 6. The luggage holding elements 35 are horizontally disposed on and secured to the side plates at right angles thereto.

The modification of the present invention illustrated in Fig. 7 is characterized by the two side plates 36 and 37 being rigidly connected together by rods 38 and 39, the rods holding the plates disposed in spaced opposed relation with the luggage holding members 40 horizontally disposed and in opposite aligned relation. The rods 38 and 39 provide means to hold the plates 36 and 37 vertically disposed in a trunk compartment of an automobile and in spaced opposed relation. Resilient tipped feet 41 dependent from each plate, 36 and 37, are also provided. Feet 41 preferably are similar to the feet 23 and caps 24 for engagement with the bottom channel members 21 and 22 shown in the preceding figures.

In the modification illustrated in Fig. 8, a plurality of bent leg members 42, 43, 44, 42', 44', 45, 46 and 47 each have horizontally extending portions 48 and dependent portions 49. A central straight leg member 43' is also provided. The members 42—47 and 42' and 44' are connected centrally together at their horizontally disposed portions 48 by a central spoke ring 50 which is attached to the central straight leg member 43'. Ring 50 has spokes 50' extending from it. Luggage holding members 51 in the form of stub bars or rods are horizontally disposed and secured at spaced intervals to the dependent portion 49 of all the leg members.

All the leg members are extensible and have rubber tipped caps 52 at their free ends or feet. Each leg member is of hollow rod construction having a plurality of separate sections 53 and 54 held together by rods 56 movable therein. The spokes 50' of spoke ring 50 may be frictionally held in the horizontally disposed portions 48 of the bent leg members to make these members slidably extendable as illustrated in Fig. 10.

Preferably a lug 57 on the end of the spoke 50' is provided for abutment with the end wall 57' of a bent leg member to prevent a spoke from being pulled entirely out of a bent leg member.

Rods 56 may be provided with oppositely directed threads 56' and 56" (Fig. 11) at each end and the sections 53 and 54 of the leg member internally threaded so that extension or contraction of the sections is possible merely by turning the rods 56.

In the modification of the invention shown in Fig. 9, the bent leg members 58 are provided with bent portions 59 stiffly bendable to dispose the depending portion 60 of each leg member 58 at an obtuse angle to the horizontally disposed portion 61. A central straight leg member 68 is similarly constructed with a depending portion 69. In this manner the rack can be conformed in shape to the luggage pile to be put thereon, the larger pieces of luggage being put on the lower shelves of the rack and the smaller pieces being "pyramided" on the upper shelves of the rack. Luggage holding members 62 on leg members 58 may be similarly bent to maintain their horizontal alignment. Luggage holding members 62 on the straight leg members 58 and 68 are fixed and remain horizontal.

Leg members 58 each have ring rods 70 extending from their horizontally disposed portions 61 and freely fit over a central threaded stud 71 extending from the straight central leg member 68. Wing nut 72 on the stud 71 holds the leg members 58 in any desired position. In this manner, the entire structure may be collapsed and stored in a small storage space.

To provide further adjustment, the bent leg members 58 may have sections 63 and 64 with their ends flattened and provided with corresponding openings 65 and 66 with a bolt 67 extending through the openings 65 and 66. A wing nut 68 on bolt 67 permits easy adjustment of the sections 63 and 64 to provide any angle desired between these sections.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:

A luggage rack for an automobile trunk comprising a central straight tubular leg member having a disk-shaped upper end, a threaded stud extending upwardly from said disk-shaped end, a plurality of substantially inverted L-shaped tubular leg members, circular in cross-section, pivotally and collapsibly connected to the upper end of said central leg member and spaced outwardly and radially of said central leg member, said L-shaped legs having horizontal and vertical portions, said connection including radial rods, said rods having an integral ring portion at one end encircling the stud, said ring portions being arranged on the disk-shaped upper end of the straight central leg in superposed relation, the other end of the radial rods being inserted in the ends of the horizontal portions of the L-shaped leg members, a wing nut on the stud above the ring portions for clamping said ring portions together, horizontally disposed short projections spaced along the vertical portions of the L-shaped leg members for supporting luggage, and resilient feet on the bottom ends of said vertical portions.

References Cited in the file of this patent

UNITED STATES PATENTS

| | | |
|---|---|---|
| 1,572,340 | Warren | Feb. 9, 1926 |
| 1,600,823 | Hess | Sept. 21, 1926 |
| 2,419,422 | Schulein | Apr. 22, 1947 |
| 2,541,702 | Katz | Feb. 13, 1951 |
| 2,550,150 | Hartley | Apr. 24, 1951 |
| 2,650,717 | Larson | Sept. 1, 1953 |